US012776643B2

(12) United States Patent
Bose et al.

(10) Patent No.: US 12,776,643 B2
(45) Date of Patent: Oct. 27, 2026

(54) TRANSFORMER ENERGIZATION WITH LOW INRUSH CURRENT

(71) Applicant: ABB Schweiz AG, Baden (CH)

(72) Inventors: Veerakumar Bose, Richmond, VA (US); Christopher Alan Belcastro, Richmond, VA (US); Lakkimsetti Anjankumar, Bangalore (IN)

(73) Assignee: ABB SCHWEIZ AG, Baden (CH)

( * ) Notice: Subject to any disclaimer, the term of this patent is extended or adjusted under 35 U.S.C. 154(b) by 141 days.

(21) Appl. No.: 18/478,612

(22) Filed: Sep. 29, 2023

(65) Prior Publication Data

US 2025/0112458 A1 Apr. 3, 2025

(51) Int. Cl.

*H02H 9/00* (2006.01)
*H02H 9/02* (2006.01)
*H02H 3/08* (2006.01)

(52) U.S. Cl.

CPC ............ *H02H 9/002* (2013.01); *H02H 9/025* (2013.01); *H02H 3/083* (2013.01)

(58) Field of Classification Search

CPC ............................... H02H 9/002; H02H 9/025
See application file for complete search history.

(56) References Cited

U.S. PATENT DOCUMENTS 5,808,378 A * 9/1998 O'Leary .................. H02J 3/38 307/127
11,258,296 B1 * 2/2022 Bose .................... H03K 17/732
2014/0132080 A1 * 5/2014 Bush ...................... H03K 17/94 307/130
2022/0247167 A1 * 8/2022 Song .................... H02H 1/0007

* cited by examiner

*Primary Examiner* — Thienvu V Tran
*Assistant Examiner* — Christopher J Clark
(74) *Attorney, Agent, or Firm* — Greenberg Traurig, LLP

(57) ABSTRACT

Systems and methods for reducing inrush current to energize a transformer from a first power source or second power source using a transfer switch device including monitoring input phase voltage at a first and second switching pair, sending a first set of gate signals to the first switching pair and second set of gate signals to the second switching pair to selectively couple the transformer to the first power source or second power source, and operating the first switching pair and second switching pair in a normal operating mode at a next cycle once transformer flux reaches a saturation point. The transfer switch device includes a first switch and second switch connected to the first power source and second power source, respectively, and each switch including the first switching pair and second switching pair connected in a reverse orientation to enable a bi-directional flow of current at each phase.

16 Claims, 8 Drawing Sheets

TRANSFORMER ENERGIZATION WITH LOW INRUSH CURRENT

FIELD

The present disclosure relates to the field of static transfer switches. And, more particularly, to transformer energization with low inrush current.

BACKGROUND

Static transfer switches are typically used to control the electrical power supply to critical electrical components such as, for example, data centers where a constant, high-quality electrical supply is required. Static transfer switches couples electrical load(s) to two different electrical power sources. Typically, the electrical power sources may be a primary grid-tied power source and an alternate source such as, for example, electrical generators or a renewable power source. When the electrical power supplied from a first electrical power source is interrupted, or when fluctuations are detected at the first electrical power source, the static transfer switch performs a switching operation and transfers connection of the electrical load(s) to a second electrical power source, where the electrical loads(s) may remain connected until a time that the electrical load(s) may be reconnected to the first electrical power source.

SUMMARY

When a transformer is first energized or reenergized after an interruption, it may draw a high inrush current exceeding the rated system current. In a number of applications and systems, such high inrush currents may approach or exceed fault protection trip levels and may highly stress or damage other components coupled with the transformer. Conventional proposals for transformer energization suffer from a number of disadvantages and shortcomings. Some proposals operate a bypass switch to close a current path bypassing a main thyristor switch, which is kept off until the transformer is energized, at which time the main thyristor switch is turned on and the bypass switch is opened. The bypass switch may be configured to withstand higher inrush currents than the main thyristor switch; however, the transformer may still draw a high inrush current, risking or causing fault protection tripping and stressing or damaging other system components. Some proposals energize the transformer using a main thyristor switch by initially firing one or more thyristors with small phase angles and thereafter gradually increasing the firing phase angle over multiple voltage cycles until the transformer is fully energized. Such proposals provide some control over inrush current; however, they are slow, requiring multiple voltage cycles to energize the transformer, and also require complex and potentially error-prone control algorithm. There remains a significant need for the unique apparatuses, methods, systems, and techniques disclosed herein.

In some embodiments, a method for reducing inrush current to energize a transformer using a transfer switch, the transfer switch including a first switch connecting a first power source to the transformer and a second switch connecting a second power source to the transformer, the method includes monitoring, by a controller, an input phase voltage at a first switching pair at a first leg and a second switching pair at a second leg, sending, by the controller for each phase, a first set of gate signals to the first switching pair and a second set of gate signals to the second switching pair to selectively control cycling to couple the transformer to the first power source or the second power source, and operating, by the controller, the first switching pair and the second switching pair in a normal operating mode at a next cycle once a transformer flux reaches a saturation point and based on a polarity of the input phase voltage, the first switch and the second switch each includes the first switching pair connected to the second switching pair in a reverse orientation to enable a bi-directional flow of phase current at each phase.

In some embodiments, sending the first set of gate signals to the first switching pair and the second set of gate signals to the second switching pair to selectively control the cycling further includes applying, by the controller for each phase, the first set of gate signals to the first switching pair based on the polarity of the input phase voltage to enable the transformer flux to build in a first direction, removing, by the controller, the first set of gate signals to turn off the first switching pair in response to the transformer flux reaching the saturation point, and applying, by the controller, the second set of gate signals to turn on the second switching pair in response to the transformer flux reaching the saturation point.

In some embodiments, the saturation point includes a sudden increase in source current.

In some embodiments, the method further includes sending, by the controller, the second set of gate signals to turn on the second switching pair at a same instant as the first set of gate signals is removed from the first switching pair to prevent the transformer flux from remaining in a saturation region.

In some embodiments, the first switching pair and the second switching pair each includes a first switching device and a second switching device.

In some embodiments, the first switching device and the second switching device each includes at least one of silicon carbide metal-oxide-semiconductor field-effect transistors (SIC MOSFETs), insulated-gate bipolar transistors (IGBTs), and integrated gate-commutated thyristors (IGCTs).

In some embodiments, the first switching device and the second switching device includes silicon controlled rectifiers (SCRs).

In some embodiments, the first switching pair and the second switching pair each further includes a resonant circuit, the resonant circuit is connected in parallel to the first switching pair or the second switching pair, and the resonant circuit being configured to inject a reverse current to enable the first switching device and the second switching device to commute to zero.

In some embodiments, operating the first switching pair and the second switching pair in the normal operating mode further includes selectively controlling, by the controller, an operation of the first switching pair and the second switching pair for each cycle based on the polarity of the input phase voltage to enable the transformer flux to gradually ramp up to saturation.

In some embodiments, a system includes a first power source, a second power source, a transformer, a transfer switch including a first switch connecting the first power source to the transformer, and a second switch connecting the second power source to the transformer, and a controller including a processor, and a non-transitory computer readable medium having stored thereon one or more instructions executable by the processor to perform operations including monitor an input phase voltage at a first switching pair at a first leg and a second switching pair at a second leg, send a first set of gate signals to the first switching pair and a second set of gate signals to the second switching pair to selectively control cycling to couple the transformer to the first power source or the second power source, and operate the first switching pair and the second switching pair in a normal operating mode at a next cycle once a transformer flux reaches a saturation point and based on a polarity of the input phase voltage, the first switch and the second switch each includes the first switching pair connected to the second switching pair in a reverse orientation to enable a bi-directional flow of phase current at each phase.

In some embodiments, sending the first set of gate signals to the first switching pair and the second set of gate signals to the second switching pair to selectively control the cycling at the first switch or the second switch further includes to apply the first set of gate signals to the first switching pair based on the polarity of the input phase voltage to enable the transformer flux to build in a first direction, remove the first set of gate signals to turn off the first switching pair in response to the transformer flux reaching a saturation point, and apply the second set of gate signals to turn on the second switching pair in response to the transformer flux reaching the saturation point. In some embodiments, the saturation point includes a sudden increase in source current.

In some embodiments, the operations further include sending, by the controller, the second set of gate signals to turn on the second switching pair at a same instant as the first set of gate signals is removed from the first switching pair to prevent the transformer flux from remaining in a saturation region.

In some embodiments, the first switching pair and the second switching pair each includes a first switching device and a second switching device.

In some embodiments, the first switching device and the second switching device each includes at least one of SiC MOSFETs, IGBTs, IGCTs, and SCRs.

In some embodiments, the first switching device and the second switching device includes SCRs, and the first switching pair and the second switching pair each further includes a resonant circuit, the resonant circuit is connected in parallel to the first switching pair or the second switching pair, the resonant circuit being configured to inject a reverse current to enable the first switching device and the second switching device to commute to zero.

In some embodiments, a transfer switch device includes a first switch connected to a first power source, a second switch connected to a second power source, and the first switch and the second switch each including a first switching pair at a first leg, and a second switching pair at a second leg, the first switching pair is connected to the second switching pair in a reverse orientation to enable a bi-directional flow of phase current, a controller in electrical connection with the transfer switch device performs operations including monitor, at each phase, an input phase voltage at the first switching pair and the second switching pair, send a first set of gate signals to the first switching pair and second set of gate signals to the second switching pair to selectively control cycling to couple a transformer to the first power source or the second power source, and operate the first switching pair and the second switching pair in a normal operating mode at a next cycle once a transformer flux reaches its saturation point and based on a polarity of the input phase voltage.

In some embodiments, sending the first set of gate signals to the first switching pair and the second set of gate signals to the second switching pair to selectively control the cycling at the first switch or the second switch further includes to apply the first set of gate signals to the first switching pair based on the polarity of the input phase voltage to enable the transformer flux to build in a first direction, remove the first set of gate signals to turn off the first switching pair in response to the transformer flux reaching a saturation point, apply the second set of gate signals to turn on the second switching pair in response to the transformer flux reaching the saturation point, and sending, by the controller, the second set of gate signals to turn on the second switching pair at a same instant as the first set of gate signals is removed from the first switching pair to prevent the transformer flux from remaining in a saturation region, the saturation point including a sudden increase in source phase current, and the controller sends the second set of gate signals to turn on the second switching pair at a same instant as the first set of gate signals is removed from the first switching pair to prevent the transformer flux from remaining in a saturation region.

In some embodiments, the first switching pair and the second switching pair each includes a first switching device, and a second switching device, wherein the first switching device and the second switching device includes at least one of SiC MOSFETs, IGBTs, IGCTs, and SCRs.

In some embodiments, the first switching device and the second switching device each include SCRs. In some embodiments, at each phase, the first switch and the second switch each further includes a resonant circuit, the resonant circuit is connected in parallel to the first switching pair or the second switching pair, the resonant circuit being configured to inject a reverse current to enable the first switching device and the second switching device to commute to zero.

In some embodiments, the operations further includes cycling the first switching pair on/off for one or more cycles over a time period to enable the transformer flux to gradually ramp up in a first direction.

BRIEF DESCRIPTION OF THE DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Various embodiments of the present disclosure relate to systems, devices, and methods for selectively performing switching operations at a transfer switch to couple an electrical load to different electrical power sources while limiting inrush currents by balancing the residual flux by controlling the gating signals to the solid-state switching devices (SSSDs) in the transfer switch, and thereby preventing interruptions in supplying electrical power to the load. In this regard, the transfer switch limits transformer inrush currents by controlling the gating signals to the SSSDs in a first switching pair so that the transformer flux slowly builds in one direction at one or more phases. A first set of gate signals is sent to the switching pair to enable current to flow in a first direction. At the instant the transformer flux reaches the saturation point (sudden increase in source current), the first set of gate signals is turned off and a second set of gate signals is turned on so that the transformer flux will not remain in the saturation region. In the next cycle, the first switching pair may be cycled on in normal operation based on the polarity of the input phase voltage.

Various embodiments of the present disclosure include a system including a transfer switch and a controller including a processor and a memory having stored thereon instructions executable by the processor to perform operations including controlling the transfer switch and the components thereof. In this regard, the instructions may include a logic for balancing the transformer flux to enable transformer energization with low inrush current at a first switch or a second switch based on whether the first power source or second power source is being connected to the load. Accordingly, the system may provide one or more improvements over conventional transfer switches and conventional methods of transfer switch control by preventing transformer failure due to excessive inrush current, preventing upstream device failures due to sudden inrush current, preventing upstream breaker trips which may cause load drops for the electrical load, increasing the life expectancy for upstream load devices, and enabling introduction of transformers having higher inrush currents which in turn can decrease the overall cost to manufacture such systems.

Figure 1:
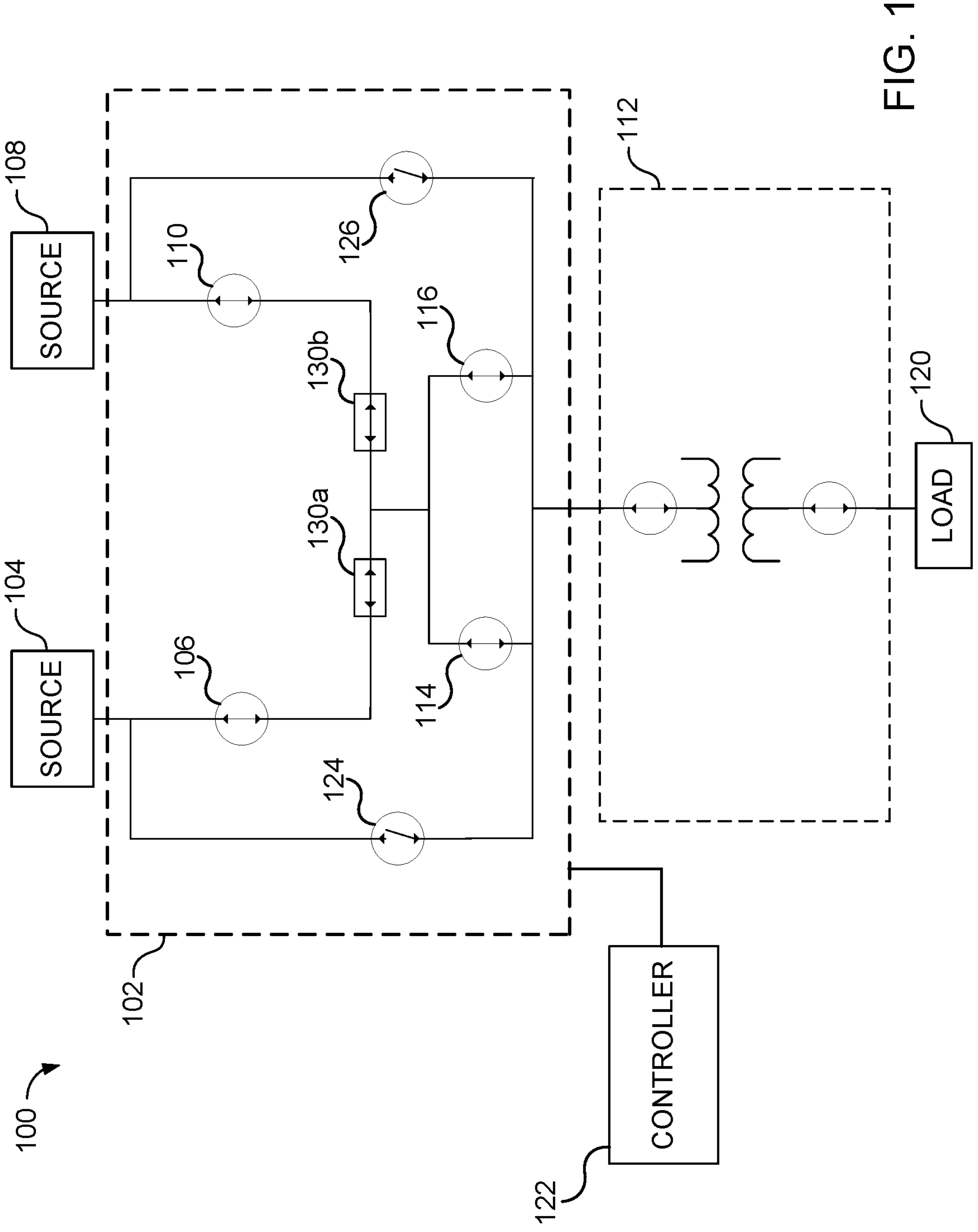
FIG. 1 depicts a schematic diagram of a non-limiting example of a system, according to some embodiments.

FIG. 1 illustrates a schematic diagram of a system 100, according to some embodiments.

The system 100 includes a transfer switch 102 which is conductively coupled to a first electrical power source 104, hereinafter referred to as first source 104, via a first mechanical circuit breaker (MCB) 106, and a second electrical power source 108, hereinafter referred to as second source 108, which is conductively coupled with the transfer switch 102 via a second MCB 110. The system 100 further includes a transformer 112 including a primary side which is conductively coupled with the transfer switch 102 via a third MCB 114 and a fourth MCB 116, and a secondary side which is conductively coupled with a load 120.

The first source 104 and the second source 108 may be a number of forms and types of electrical power sources, for example, a utility grid, a microgrid, a nanogrid, a backup generator, an uninterruptable power supply (UPS) or backup battery, a flywheel operatively coupled with a motor/generator, a PV array, a wind farm, a fuel cell installation, or any of a number of other sources of electrical power as will occur to one of skill in the art with the benefit of the present disclosure. One of the first source 104 and the second source 108 may be a primary or preferred power source for the system 100 and the other of the first source 104 and the second source 108 may be a secondary or backup power source for the system 100. In some embodiments, the first source 104 may be a utility grid serving as a primary power source and the second source 108 may be one or more UPS serving as a backup power source. In some embodiments, the transfer switch 102 may also be considered and referred to as a bypass switch or a UPS bypass switch. The load 120 may be any of a variety of types of load systems, for example, a datacenter, educational facility, governmental facility, hospital or other healthcare facility, manufacturing, chemical or other industrial plant, water treatment plant, or other types of loads or load systems as will occur to one of skill in the art with the benefit of the present disclosure.

The MCB 106, 110, 114, 116 are configured and operable to provide fault protection by transitioning from a closed-circuit state to an open-circuit state in response to a fault condition, such as an over-current condition, an over-voltage condition, and/or another fault condition. Furthermore, the MCB 106, 110, 114, 116 may be configured and operable to provide passive fault protection, active fault protection, or other active opening or closing operation (e.g., in response to control signals received from the electronic control system (ECS) 122), or both. It shall be appreciated that certain embodiments may omit one or more of the MCB 106, 110, 114, 116. Furthermore, certain embodiments may comprise additional or alternate fault protection devices as will occur to one of skill in the art with the benefit of the present disclosure.

The system 100 may also include a fifth MCB 124, which may be conductively coupled between the first source 104 and the transformer 112, and a sixth MCB 126, which may be conductively coupled between the second source 108 and the transformer 112, according to some embodiments. The MCB 124, 126 are configured to selectably provide a closed circuit connection between the first source 104 and the second source 108, respectively, bypassing the transfer switch 102 and may be actively controlled by the ECS 122, hereinafter referred to as controller 122. It shall be appreciated that certain embodiments may omit one or both of the MCB 124, 126. Furthermore, certain embodiments may include additional or alternate bypass devices as will occur to one of skill in the art with the benefit of the present disclosure.

The controller 122 may include a processor and a memory. The memory may be a computer readable medium having stored thereon instructions executable by the processor to perform operations in accordance with the present disclosure. The controller 122 may include one or more other components, including components capable of placing the controller 122 in electrically communicable connection with the transfer switch 102 and to monitor and control the operation of the transfer switch 102 based on one or more parameters measured at the transfer switch 102 such as, for example, by one or more sensors (not shown). In some embodiments, the controller 122 may be operatively coupled with the transfer switch 102. Additionally, in some embodiments, the controller 122 may in some forms also be operatively coupled with one or more of the MCB 106, 110, 114, 116, 124, 126 and may monitor and/or actively control one or more of the MCB 106, 110, 114, 116, 124, 126. The controller 122 may be provided as a portion or component of the transfer switch 102 (e.g., provided in a common housing or as a common unit), as one or more separate components, or distributed among one or more components forming a portion of the transfer switch 102 and one or more separate components. The controller 122 may include one or more integrated circuit-based (e.g., microprocessor-based, microcontroller-based, ASIC-based, FPGA-based, and/or DSP-based) control units as well as related driver, input/output, signal conditioning, signal conversion, non-transitory machine-readable memory devices storing executable instructions, and other circuitry.

The transfer switch 102 may be a static transfer switch including one or more switches 130, which can be controlled to energize (or deenergize) the transformer 112 by conductively coupling (or decoupling) the transformer 112 with either the first source 104 or the second source 108. Each of the switches 130 may include one or more SSSDs 132 arranged in one or more switching pairs, as will be further described herein. Referring to FIG. 1, the transfer switch 102 includes two of the switches 130, one of the switches 130 may be controllable by the controller 122 to cycle to an on or closed state which conductively couples the first source 104 with the transformer 112 (provided that the MCB 106, 114 are in a closed state) and to an off or open state which conductively decouples the first source 104 with the transformer 112. Another of the switches 130 is controllable by the controller 122 to an on or closed state which conductively couples the second source 108 with the transformer 112 (provided that the MCB 110, 116 are in a closed state) and to an off or open state which conductively decouples the second source 108 with the transformer 112. The switches 130 may be provided in a number of configurations and forms including, for example, the forms illustrated and described below in connection with FIGS. 2 and 3.

It shall be appreciated that system 100 may be provided in a single-phase form, a three-phase form, or other multi-phase forms. Such multi-phase forms, the first source 104 and the second source 108 may be multi-phase power sources (e.g., three-phase power sources). In such forms, the MCB 106, 110, 114, 116, 124, 126, the transfer switch 102 and its constituent switches 130, and the transformer 112, may be provided in corresponding multi-phase forms and arrangements (e.g., three-phase forms and arrangements) wherein an additional instance of these components may be provided to service each additional phase.

Furthermore, while system 100 is illustrated as comprising a first source 104 and a second source 108, it shall be appreciated that additional sources may also be present in certain embodiments and that such additional sources may include additional respective MCB components for fault protection and bypass operation and additional respective constituent switches 130 of the transfer switch 102.

Figure 2:
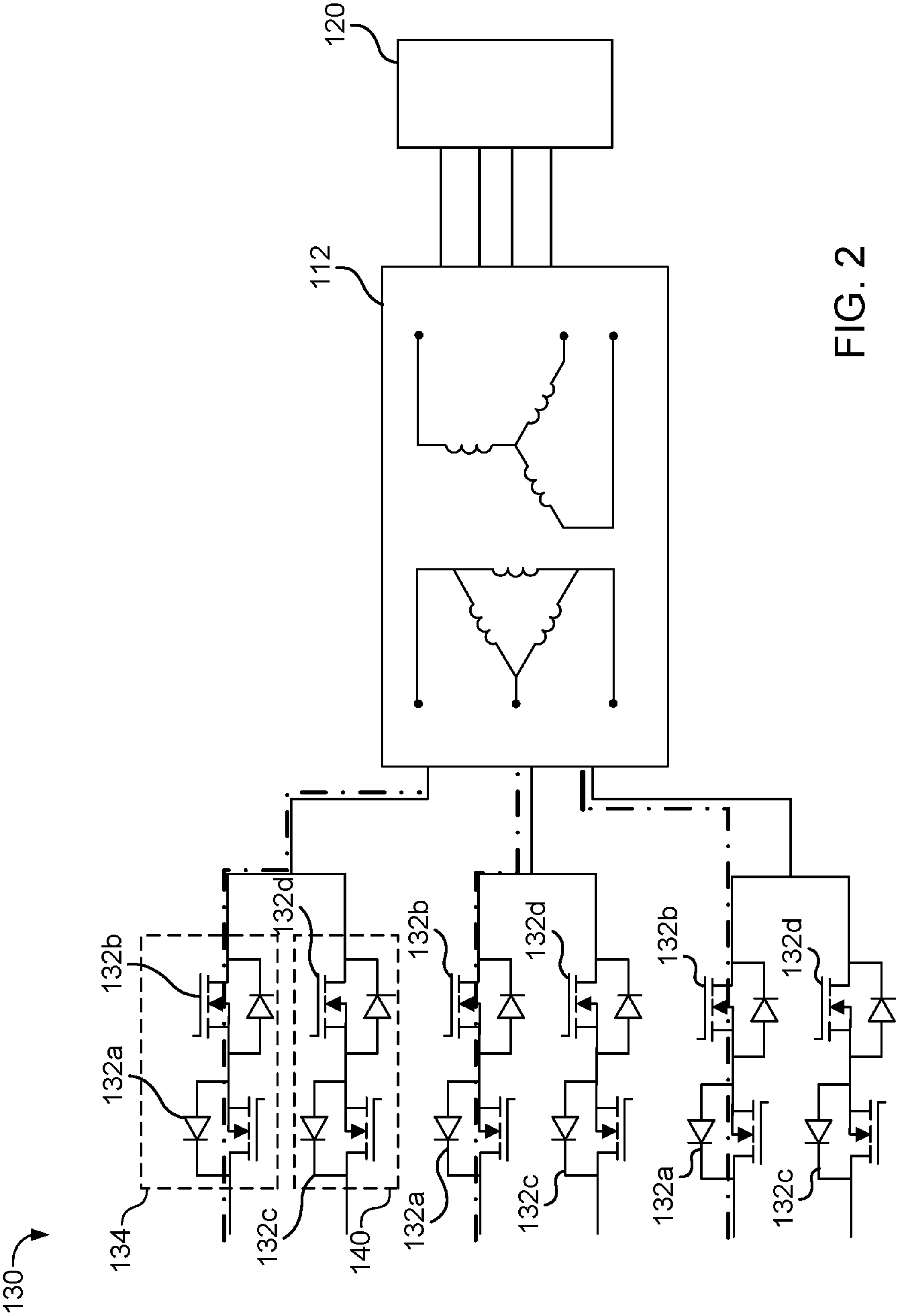
FIG. 2 illustrates a first schematic diagram of a portion of the system, according to some embodiments.
Figure 3:
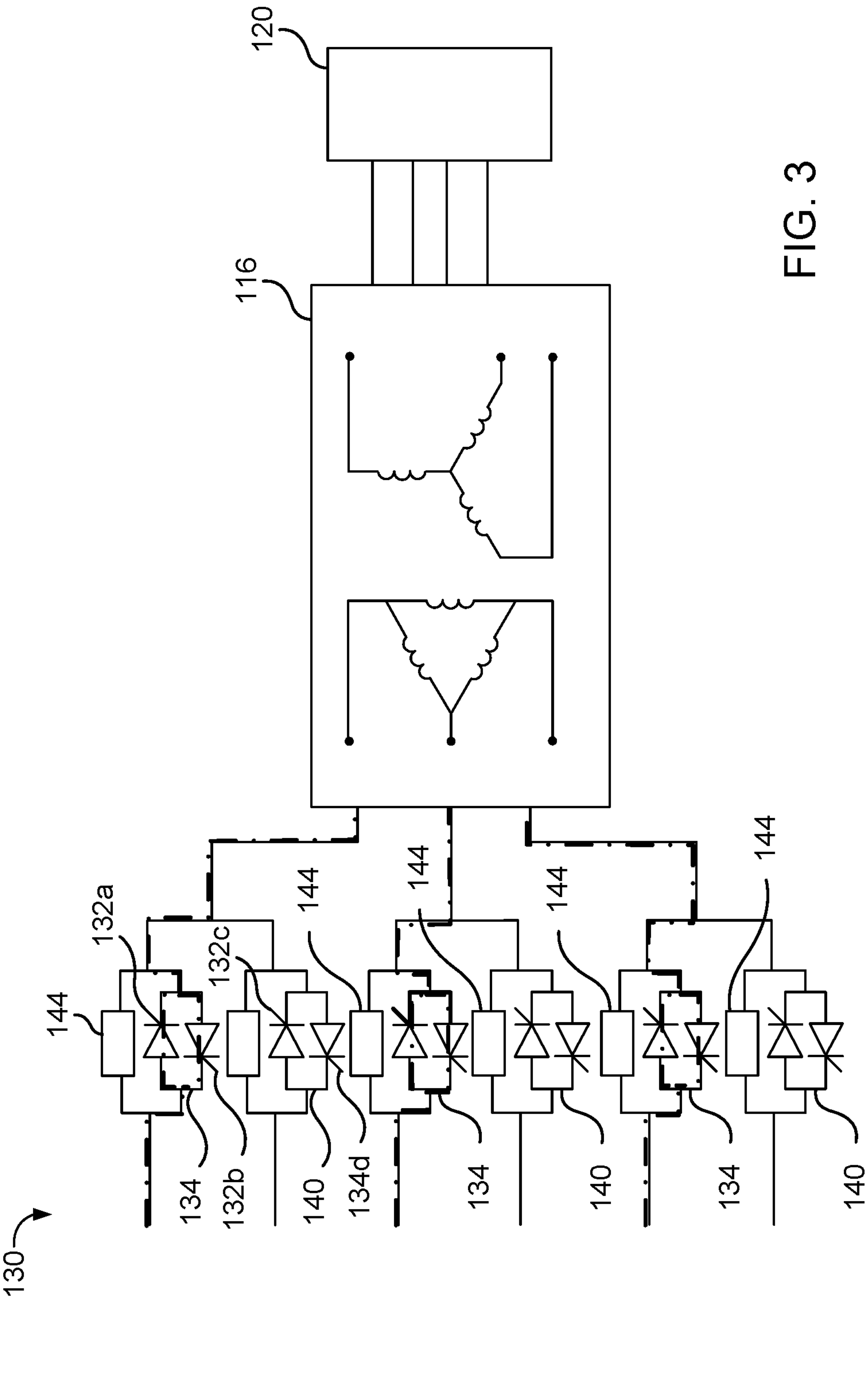
FIG. 3 illustrates a second schematic diagram of the portion of the system, according to some embodiments.

FIG. 2 illustrates a first schematic diagram of a portion of the system 100, according to some embodiments. FIG. 3 illustrates a second schematic diagram of the portion of the system 100, according to some embodiments. Unless specifically referenced, FIGS. 2 and 3 will be described collectively.

In the transfer switch 102, each of the switches 130 may include therein one or more solid-state switching devices (SSSDs) 132, which can be selectively controlled to energize (or deenergize) the transformer 112 by conductively coupling (or decoupling) the transformer 112 (and load 120) with the first source 104 or the second source 108, respectively, according to some embodiments. In the transfer switch 102, at each phase, the switch 130 may include SSSD 132*a*, 132*b*, 132*c*, 132*d*. At each respective phase, the switch 130 may include SSSD 132*a* and SSSD 132*b* connected in a reverse orientation at a first leg 138 and forming a first switching pair 134, and SSSD 132*c* and SSSD 132*d* connected in reverse orientation at a second leg 142 and forming a second switching pair 140. The SSSDs 132*a*, 132*b* of the first switching pair 134 and SSSDs 132*c*, 132*d* of the second switching pair 140 may be arranged in reverse orientation to enable a bi-directional flow of electrical current in both the forward and reverse direction.

The SSSDs 132 may include a fully controlled power semiconductor device such as, for example, SiC metal-oxide-semiconductor field-effect transistors (MOSFETs), insulated gate bipolar transistors (IGBTs), bipolar junction transistors (BJTs), junction-gate field effect transistors (JFETs), silicon-controlled rectifiers (SCRs) with paralleled resonant turn-off (RTO) circuit 144, other types of switching devices, or any combinations thereof.

In the transfer switch 102, the switch 130 may be operated, by selectively controlling the gating signals sent to the SSSDs 132 in the first switching pair 134 and second switching pair 140, to gradually energize the transformer 112 from the first source 104 or second source 108, respectively. At each phase, a first set of gate signals may be sent to SSSD 132*a* at a first time period to cycle on SSSD 132*a* during a positive polarity of the input source voltage Vs to enable the transformer flux to build in a first direction. For example, and as shown in FIG. 2, the first set of gate signals may cycle on, at each phase, SSSD 132*a* at the first leg 138 based on the input voltage having a positive polarity.

Once the transformer flux has reached a saturation point (e.g., a certain set point), at a second time period, the first set of gate signals may be turned off to cycle off SSSD 132*a* and a second set of gate signals may be sent to cycle on SSSD 132*b* so that the transformer flux will not stay in the saturation region for a longer period of time. Additionally, in the next cycle, the SSSDs 132*a*, 132*b* may be turned ON regularly so that the STS may be operated in a normal operating mode based on the polarity of the input phase voltage.

The SSSDs 132 in each of the first switching pair 134 and second switching pair 140 may include SiC metal-oxide-semiconductor field-effect transistors (MOSFETs), according to some embodiments. In this regard, at each phase, the first switching pair 134 and the second switching pair 140 may each include a first SiC MOSFET and a second SiC MOSFET connected in an anti-series arrangement to enable the bi-directional flow of current.

Referring to FIG. 3, the SSSDs 132 in each of the first switching pair 134 and second switching pair 140 may include silicon-controlled rectifiers (SCRs) with paralleled RTO circuits 144, according to some embodiments. In this regard, at each phase, the first switching pair 134 and second switching pair 140 may each include a first SCR and second SCR connected in an anti-parallel arrangement to enable a bi-directional flow of current. The first switching pair 134 and second switching pair 140 may also each include a paralleled RTO circuit 144. For example, SSSD 132*a* and SSSD 132*b* may be connected at the first leg 138 in anti-parallel, and SSSD 132*c* and SSSD 132*d* may be connected in anti-parallel at the second leg 142. During the switching operation, the first set of gate signals obtained by the SSSD 132*a* may include one or more gate pulses at a positive polarity of the source phase voltage such that the transformer flux gradually increases in stepped increments to saturation. Once the transformer flux has reached saturation, at the second time period, the SSSD 132*a* may be cycled off and a second set of gate pulses may be sent to cycle on the SSSD 132*b* to limit the amount of time the transformer flux remains in the saturation region. On the next cycle, the SSSDs 132 in the switches 130 may be operated normally.

During the thyristor turn-off of the SCR at the second period of time, a reverse voltage is injected by the RTO circuit 144, which forces the thyristor current to commute quickly to zero. For example, in some embodiments, the RTO circuit 144 can cause the SCR to interrupt the current within 1 msec. In this regard, the thyristor turn-off time with the RTO circuit 144 is much shorter than the thyristor turn-off time without the RTO circuit 144. In some embodiments, the thyristor turn-off time may be a half cycle of the source fundamental frequency. For example, the thyristor turn-off time may be 8.3 msec in a 60 Hz AC system.

It is to be appreciated by those having ordinary skill in the art that the types of SSSDs 132 included in the switches 130 of transfer switch 102 are not intended to be limiting and the switches 130 may include therein the SSSDs 132 as described herein or other types of switching devices capable of fast switching operations such that the transfer switch 102 may limit an inrush transformer current when switching between the first source 104 and second source 108, in accordance with the present disclosure.

Figure 4:
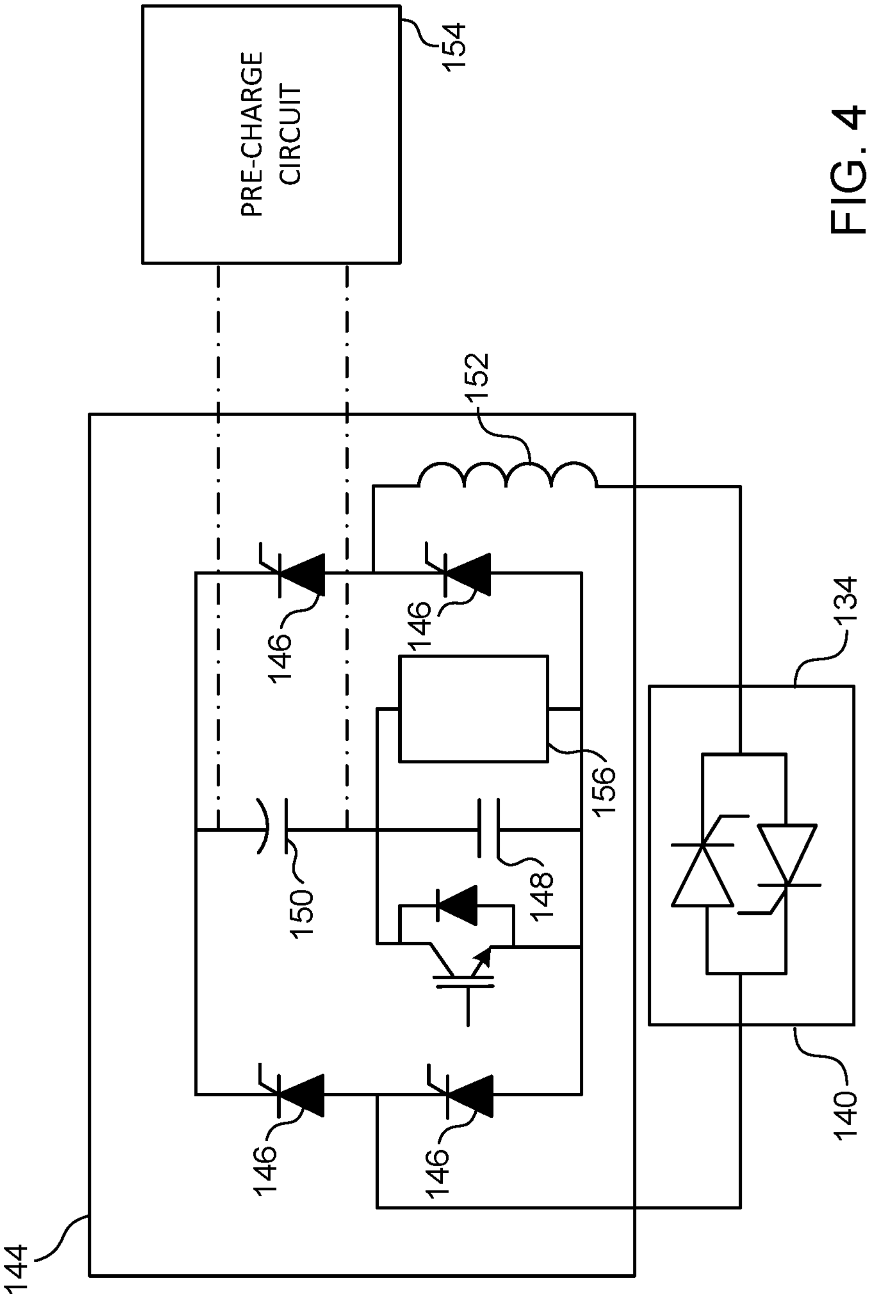
FIG. 4 illustrates a schematic diagram of a portion of the system, according to some embodiments.

FIG. 4 illustrates a schematic diagram of a non-limiting example of the RTO circuit 144, according to some embodiments.

The RTO circuit 144 is connected in parallel with the first switching pair 134 or second switching pair 140 and structured to receive power and output a resonant current to first switching pair 134 or first switching pair 134. It shall be appreciated that RTO circuit 144 as shown in FIG. 4 is an example embodiment of a resonant circuit according to the present disclosure. Other embodiments may include a number of additions, modifications, or alternative resonant circuit arrangements including different types and arrangements of legs, switching devices, and capacitors.

The RTO circuit 144 includes four switching devices 146, resonant capacitor 148 for energy storage, pre-charged capacitor 150, and resonant inductor 152. In some embodiments, the RTO circuit 144 includes a voltage clamp 156. The voltage clamp 156 may be a metal oxide varistor (MOV), in some embodiments. Other embodiments may include other types or arrangements of voltage clamps. In the illustrated embodiment, the RTO switching devices 146 comprise thyristors. In other embodiments, the RTO switching devices may comprise other types of semiconductor switching devices such as insulated gate bipolar transistors (IGBT).

The RTO circuit 144 provides three possible design choices to control performance: resonant capacitance value C from resonant capacitor 148, pre-charged initial capacitor voltage Vc0 from pre-charged capacitor 150, and resonant inductance value L from inductor 152. These parameters can be used to determine how much and how fast the main thyristor current can be turned off, as well as the size and cost of the auxiliary resonant circuit. The pre-charged capacitor 150 may be pre-charged by pre-charge circuit 154 to provide resonant current to create a zero-current crossing for the SSSDs 132 in the first switching pair 134 or second switching pair 140. The inductor 152 limits di/dt for SSSDs 132 during turn-off. During normal conduction, only the SSSDs 132 are conducting and all the auxiliary switches 146 are off. Thus, the pre-charged resonant capacitor 150 is isolated from the SSSDs 132. In resonant turn-off operation, the corresponding auxiliary switches 146 (depending on current direction) are triggered to open by sending a gate signal thereto. As a result, the energy stored in the resonant capacitor 148 is discharged. When the resonant current through the inductor 152 exceeds the load current, the current through the SSSDs 132 is commuted to the resonant circuit. In the meantime, the capacitor 148 voltage provides a negative bias voltage to help the respective SSSDs 132 to turn off (i.e., open and stop conducting). When the respective SSSDs 132 current reaches zero, it starts turning off with reverse bias voltage from the resonant capacitor 148. All prior patents and publications referenced herein are incorporated by reference in their entireties.

The switches 130 is structured to open in response to control signals or commands received from the controller 122. To reduce the time necessary for opening the switches 130, the RTO circuit 144 may be configured and operable to output resonant current to the SSSDs 132 to force commutation and to thereby turn off. The RTO circuit 144 may thereby increase the speed at which the first switching pair 134 and second switching pair 140 operates to open the switches 130 (e.g., 80% faster compared to the same first switching pair 134 and second switching pair 140 without the RTO circuit 144). Further details of the operation and control of the RTO circuit 144 and switches 130 may be found in International Application No. PCT/US20/64217, filed Dec. 10, 2020, the disclosure of which is hereby incorporated by reference. It shall be appreciated that the SSSD 132 is one example of an SSSD which is quasi-fully controllable by assisted or forced commutation allowing a thyristor or other semi-controllable device, which can be turned off under only certain conditions (e.g., zero current conditions) to function as a fully controlled device via the assisted or forced commutation.

The controller 122 may be operatively coupled to the SSSDs 132 in each of the first switching pair 134 and second switching pair 140 and the controller 122 may selectively send the first set of gate signals and second set of gate signals to each SSSDs 132 to selectably turn each the SSSDs 132 on (e.g., a closed or conductive state) or off (e.g., an open or non-conductive state). The controller 122 may also be operatively coupled with the RTO circuit 144 and configured to provide control signals to the four switching devices 146 to selectably turn each of these switching devices on (e.g., a closed or conductive state) or off (e.g., an open or non-conductive state). The controller 122 may also be configured and operable to receive one or more inputs indicative of voltage, current, and/or flux values at one or more nodes of system 100 and to control system 100 as further described herein.

The controller 122 operates the RTO circuit 144 to generate and provide a resonant current (IR) configured and operable to force commutation of the first switching pair 134 or second switching pair 140. The resonant current (IR) causes the magnitude of the current conducted by first switching pair 134 or second switching pair 140 to decrease to zero and causes a reverse voltage bias across the first switching pair 134 or second switching pair 140.

It shall be appreciated that the RTO circuit 144 is one example embodiment of a resonant circuit that may be coupled in parallel with a thyristor-based SSSD such as SSSDs 132 and utilized to increase a thyristor turn-off speed by injecting a reverse current to force the thyristor current to commutate to zero. Using RTO circuit or other forms of parallel resonant circuits, thyristor-based forms the first switching pair 134 and second switching pair 140 (and SSSDs 132 therein) can interrupt the current quickly (e.g., within 1 ms). This is much shorter than the thyristor turn-off time which could be a half cycle or more of the source fundamental frequency (e.g., 8.3 ms in 60 Hz ac system).

Figure 5:
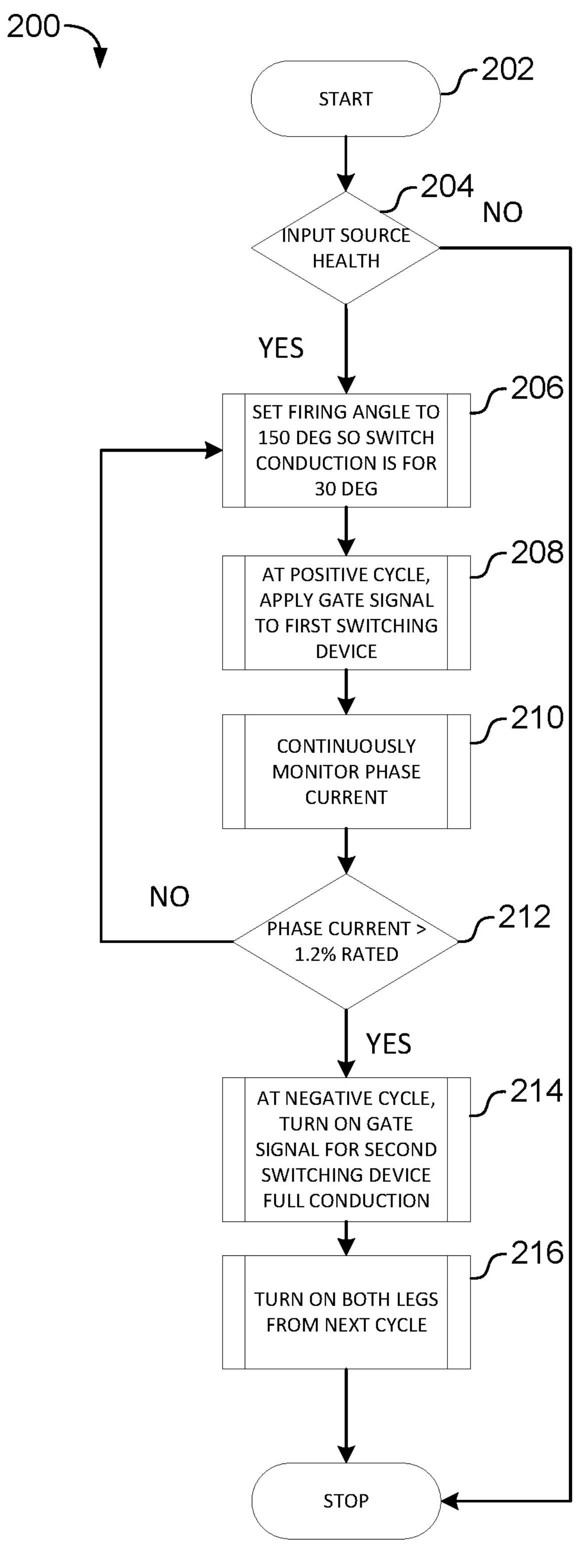
FIG. 5 illustrates a flow diagram of an example method for limiting inrush current while energizing a transformer, according to some embodiments.

FIG. 5 illustrates a flow diagram of an example method 200 for energizing a transformer 112, according to some embodiments.

At 202, the method 200 starts to perform operations for energizing a transformer 112 using a transfer switch 102. In some embodiments, the method 200 is for switching the transformer 112 from the first source 104 or second source 108 to the other of the first source 104 and second source 108. At 204, the method 200 includes determining a health condition of the onboarding first source 104 or second source 108. If the controller 122 determines the health condition of the onboarding first source 104 or second source 108 is not capable of energizing the transformer 112 and providing electrical power to the load 120, the process ends at 218. If the controller 122 determines the first source 104 or the second source 108 passes the health condition check, the process proceeds to 206.

At 206, the method 200 includes setting a firing angle for the gate signals to 150 degrees so that switch conduction may be for 30 degrees. In some embodiments, the firing angle may be set at the controller 122. At 208, based on the firing angle and during a positive cycle of the input phase voltage, a first set of gate signals may be applied to SSSD 132*a* to cycle on the SSSD 132*a* at the first leg 138. To reduce an inrush current, the controller 122 may send gate pulse signals to each of the three phases. In some embodiments, controller 122 may send gate pulse signals to one of the three phases to reduce the inrush current. In other embodiments, the controller 122 may send the gate pulse signals to a first phase and a second phase to reduce the inrush current.

At 210 the controller 122 continuously monitors the phase current. In some embodiments, the controller 122 continuously monitors the phase current of each of the three phases during the switching operations as described herein.

At 212, the phase current is compared to the rated current. In some embodiments, the phase current is compared to 1.2% of rated current to determine whether to continue cycling on the SSSD 132*a* during the positive polarity of the input phase voltage or to turn on the second set of gate signals. If the phase current is less than 1.2% of rated current, the operations may return to step 206. If the controller 122 determines the phase current is greater than 1.2% of rated current, the controller 122 proceeds to 214.

At 214, at a second period of time, the controller 122 turns on a second set of gate signals to cycle SSSD 132*b* on for full conduction. In some embodiments, sending the second set of gate signals to cycle SSSD 132*b* on includes turning off the first set of gate signals during the negative polarity of the input phase voltage. At 216, the SSSDs 132 in both the first leg 138 and second leg 142 may be turned on at the next positive cycle of the input phase voltage.

Figure 6:
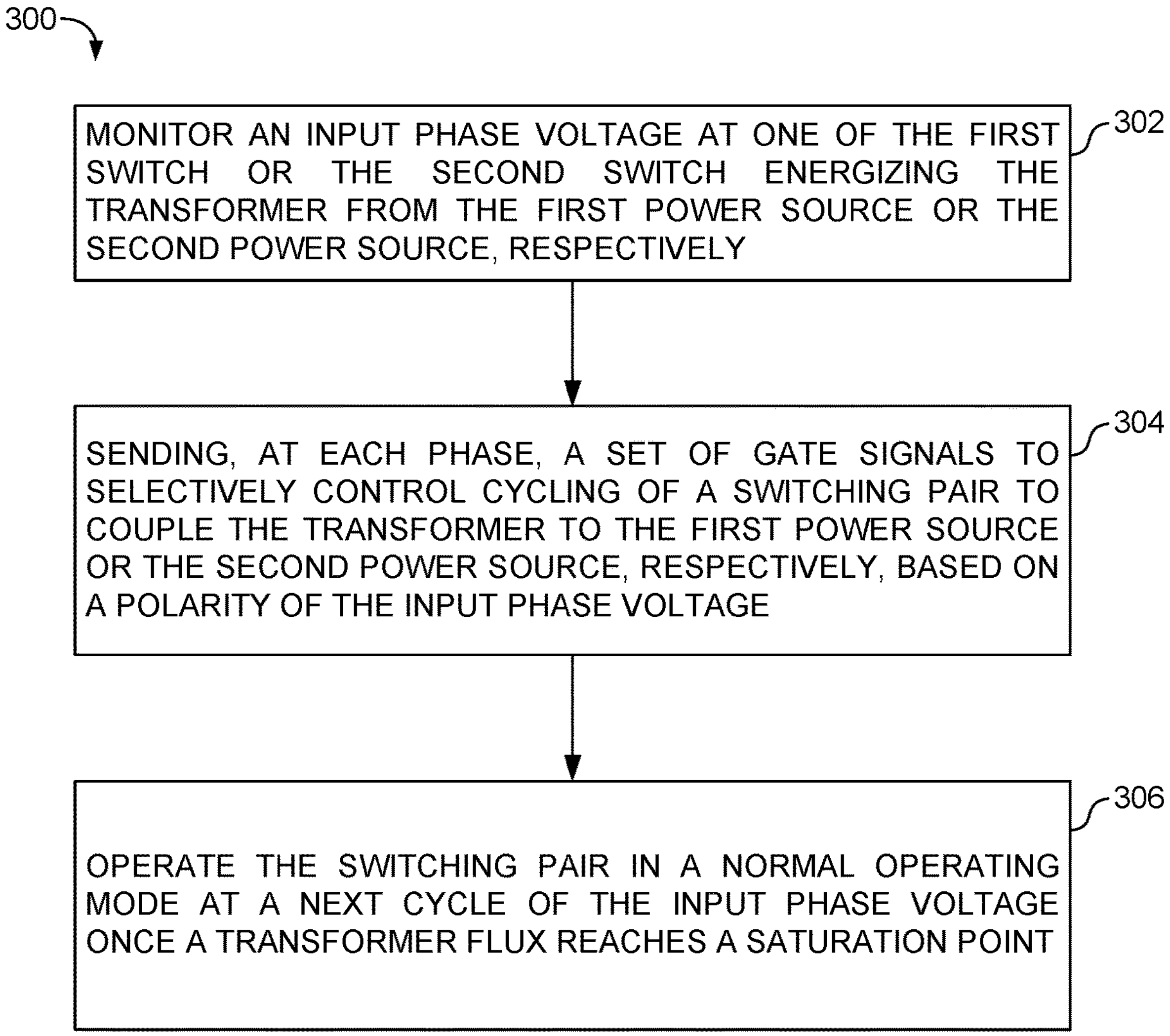
FIG. 6 illustrates a flow diagram of a second method for limiting inrush current while energizing a transformer, according to some embodiments.

FIG. 6 illustrates a flow diagram of a method 300 according to some embodiments.

At 302, the method 300 for reducing inrush current to energize a transformer 112 from a first source 104 or a second source 108 using a transfer switch 102, the transfer switch 102 including a first switch 130*a* and a second switch 130*b* connecting the transformer 112 to the first source 104 or the second source 108, respectively, the method 300 including monitoring an input phase voltage at one of the first switch 130*a* or the second switch 130*b* that is energizing the transformer 112. In some embodiments, the transformer 112 may not be connected to either the first source 104 or the second source 108, and one of the first source 104 or the second source 108 may be connected to the transformer 112 with the transfer switch 102 by the operations as described herein. In other embodiments, the transformer 112 may be connected to one of the first source 104 and second source 108, and the other of the first source 104 and second source 108 may be connected to the transformer 112 by the operations as described herein.

At each phase, the first switch 130*a* and second switch 130*b* may each include therein a switching pair 134 at a first leg 138. The switching pair 134 may include therein SSSD 132*a* and SSSD 132*b*. The SSSDs 132*a*, 132*b* in the first switching pair 134 may be connected in a reverse orientation to enable a bi-directional flow of phase current. In some embodiments, the first switch 130*a* and second switch 130*b* may include therein one or more phases connecting to the one or more corresponding phases of the first source 104 or second source 108, respectively. In this regard, the first switch 130*a* and second switch 130*b* may each include therein, at each phase, the first switching pair 134 at a first leg 138 and the second switching pair 140 at a second leg 142 connected in a reverse orientation. For example, the first switch 130*a* and second switch 130*b* may include three phases, each phase including the first switching pair 134 at a first leg 138 and second switching pair 140 at a second leg 142.

Each of the first switch 130*a* and the second switch 130*b* may each include, at each phase, a second switching pair 140 at the second leg 142. The second switching pair 140 may include therein SSSD 132*c* and SSSD 132*d*. The SSSDs 132*c*, 132*d* in the second switching pair 140 may be connected in a reverse orientation to enable a bi-directional flow of phase current through the second switching pair 140.

In some embodiments, for each phase of the first source 104 or second source 108, the transfer switch 102 may include the first switch 130*a* and second switch 130*b*. In this regard, in some embodiments, the transfer switch 102 may include one or more of the first switch 130*a*, each of the first switch 130*a* connected to a respective phase of the first source 104, and the transfer switch 102 may include one or more of the second switch 130*b*, each of the first switch 130*a* connected to a respective phase of the second source 108. For example, the first source 104 may be a three-phase AC power source and the transfer switch 102 may include a first switch 130*a* and a second switch 130*b* for each of the three phases.

In some embodiments, a controller 122 may be in electrically communicable connection with the transfer switch 102. The controller 122 may monitor the input phase voltage and control the operation of the transfer switch 102. In some embodiments, the transfer switch 102 may be configured to connect the transformer 112 to one of the first source 104 or the second source 108 based on power being available at the respective one of the first source 104 or second source 108. In a normal operation, the transfer switch 102 couples the transformer 112 to one of the first source 104 and second source 108. During a switching operation, the transfer switch 102 disconnects the first source 104 or second source 108 that is currently supplying power to the transformer 112 by turning off (e.g., disconnecting) the respective first switch 130*a* or second switch 130*b* and performing a switching operation to connect the other of the first source 104 and second source 108 to the transformer 112 to provide continuous uninterrupted power to the load 120 on the secondary side of the transformer 112.

At 304, the method 300 includes sending a set of gate signals to selectively control cycling of the switching pair 134 to couple the transformer 112 to the first power source 104 or the second power source 108, respectively, based on a polarity of the input phase voltage. The set of gate signals may be sent by the controller 122 based on the polarity of the input phase voltage of the first source 104 or the second source 108, respectively, being connected to the transformer 112 and the load 120.

Sending the set of gate signals to selectively control cycling of the switching pair 134 may further include applying, for each phase, a first set of gate signals to the SSSD 132*a* (e.g., first SSSD) based on a polarity of the input phase voltage to enable the transformer flux to build in a first direction, removing the first set of gate signals to turn off the SSSD 132*a* in response to the transformer flux reaching the saturation point, and applying a second set of gate signals to turn on a SSSD 132*b* (e.g., second SSSD) in response to the transformer flux reaching the saturation point. Additionally, in some embodiments, the method 300 may further include sending the second set of gate signals to turn on the SSSD 132*b* at a same instant as the first set of gate signals is removed from the SSSD 132*a* to prevent the transformer flux from remaining at the saturation point. In some embodiments, the second set of gate signals may be turned on at the same instant as the first set of gate signals are turned off to prevent the transformer flux from remaining in a saturation region greater than the saturation point. In this regard, the second set of gate signals cycles on the SSSD 132*b* at a same instant as the SSSD 132*a* is cycled off to prevent the transformer flux from remaining in the saturation region for an extended period, in some embodiments. In some embodiments, the saturation point may correspond to a sudden increase in source current. In other embodiments, the saturation point may correspond to the source current being 1.2% (or more) of the rated current.

At 306, the method 300 includes operating the switching pair 134 in a normal operating mode at a next cycle of the input phase voltage once the transformer flux reaches the saturation point. In some embodiments, operating the switching pair 134 in the normal operating mode at the next cycle of the input phase voltage further includes sending the second set of gate signals to turn on the second SSSD 132*b* at a same instant as the first set of gate signals is removed from the first SSSD 132*a* to prevent the transformer flux from remaining at the saturation point. Additionally, in some embodiments, operating the switching pair 134 in the normal operating mode at the next cycle of the input phase voltage further includes selectively controlling cycling operations of the first SSSD 132*a* and the second SSSD 132*b* for each cycle based on the polarity of the input phase voltage to enable the transformer flux to gradually ramp up to saturation.

The controller 122 may be configured to determine the transformer flux has reached the saturation point. Whether the transformer flux has reached saturation may be determined by the controller 122 based on obtaining the source current from one or more sensors connected to the transfer switch 102 and determining, based on the electrical signals obtained from the one or more sensors, a sudden increase in source phase current and corresponding to an increase in the transformer flux. In some embodiments, the method may further include the controller 122 determining the output phase current is greater than a certain threshold current and operating the SSSD 132*a* and the SSSD 132*b* in the normal operating mode based on the output phase current of the transfer switch 102 being greater than the certain threshold current. In some embodiments, the certain threshold current may be 1.2% of rated phase current.

The first switching pair 134 and the second switching pair 140 may each include one or more SSSDs 132. In some embodiments, the first switching pair 134 includes SSSD 132*a* and SSSD 132*b* and the second switching pair 140 includes SSSD 132*c* and SSSD 132*d*. In some embodiments, the SSSDs 132 may include at least one of SiC MOSFETs, IGBTs, IGCTs, and SCRs. In other embodiments, the SSSDs 132 may include at least one of a silicon carbide metal-oxide-semiconductor field-effect transistors (SiC MOSFETs), insulated-gate bipolar transistors (IGBTs), and integrated gate-commutated thyristors (IGCTs).

In some embodiments, the SSSD 132*a* may be a first SiC MOSFET and the SSSD 132*b* may be a second SiC MOSFET, the SSSD 132*a* and SSSD 132*b* connected in anti-series arrangement. In other embodiments, the SSSD 132*a* may be a first SCR and the SSSD 132*b* may be a second SCR, the SSSD 132*a* and the SSSD 132*b* connected in an anti-parallel arrangement. Additionally, for embodiments where the SSSD 132*a* and SSSD 132*b* include SCRs, the first switching pair 134 may further include a RTO circuit 144 connected in parallel to the first switching pair 134. The RTO circuit 144 may be configured to inject a reverse current into the SCRs to enable the first switch 130*a* or the second switch 130*b* to commute to zero to enable fast switching operations by the first switch 130*a* or the second switch 130*b*. In this regard, in some embodiments, operating the SSSD 132*a* and the SSSD 132*b* in the normal operating mode further includes selectively controlling the operation of the SSSD 132*a* and the SSSD 132*b* for each cycle based on the polarity of the input phase voltage to enable the transformer flux to gradually ramp up to saturation.

Figure 7:
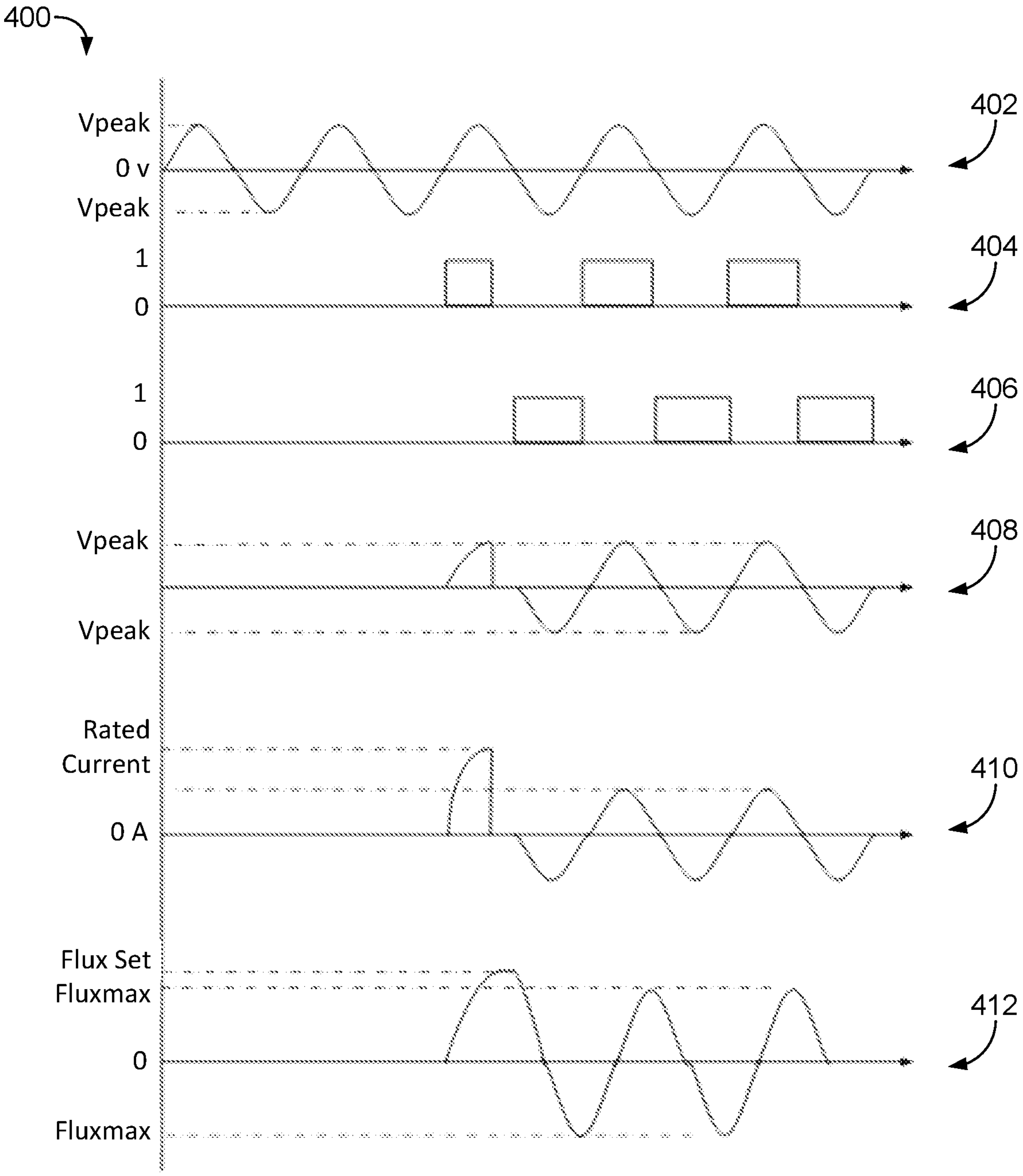
FIG. 7 illustrates a first set of graphical representations showing aspects of an example process of energizing the transformer, according to some embodiments.
Figure 8:
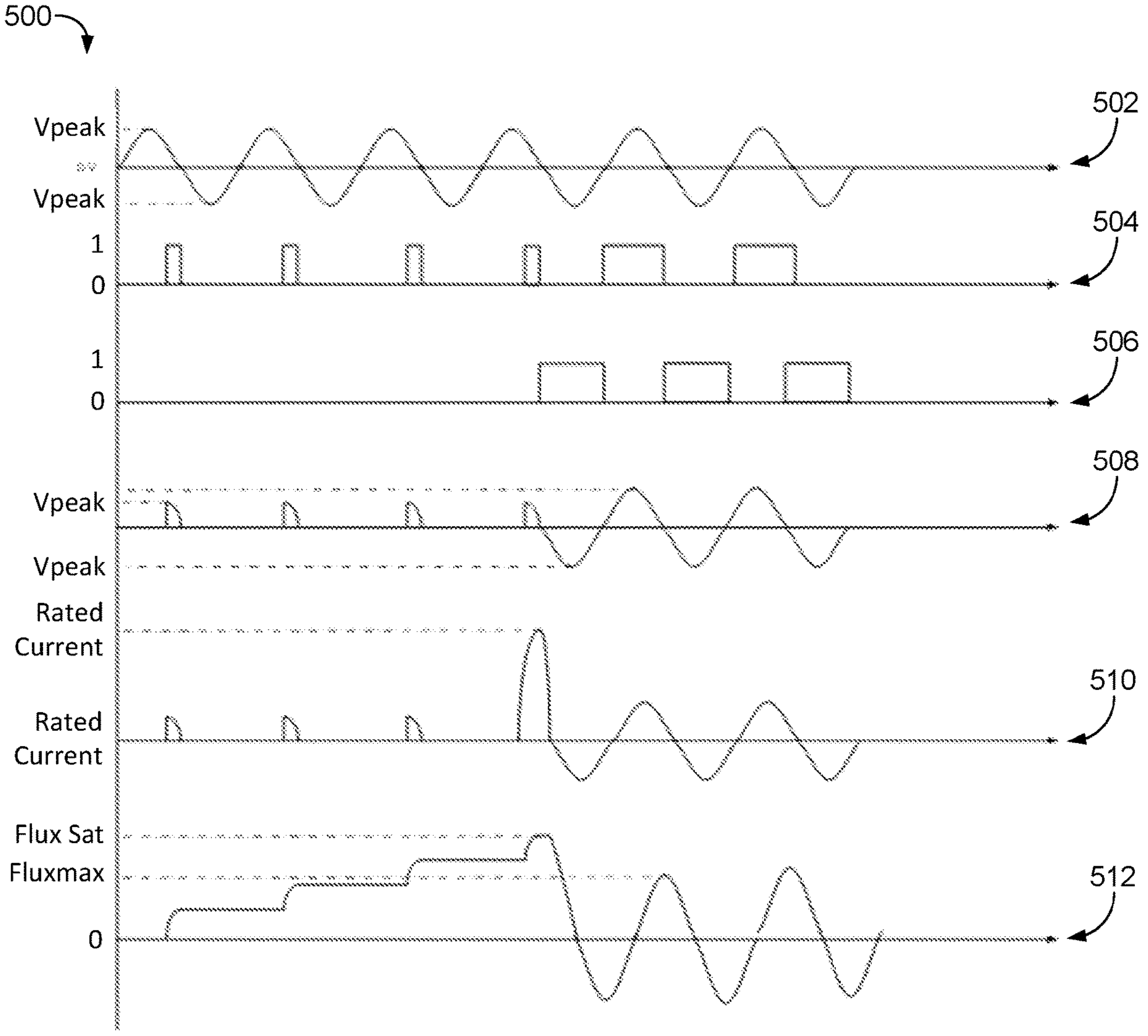
FIG. 8 illustrates a second graphical representation showing aspects of an example process of energizing the transformer, according to some embodiments.

FIG. 7 illustrates a first set of graphical representation 400 showing aspects of an example process of energizing the transformer 112, according to some embodiments. FIG. 8 illustrates a second set of graphical representation 500 showing aspects of an example process of energizing the transformer 112, according to some embodiments. Unless specifically referenced, FIGS. 7 and 8 will be described collectively.

When power supply to the transformer 112 from first source 104 or second source 108 is interrupted, the output phase voltage and current may drop to zero. In response to the power interruption, the system 100 may perform the operations in accordance with the present disclosure to switch from the first source 104 or second source 108 from which power was interrupted and may energize the transformer 112 with the other of the first source 104 and second source 108.

In this regard, at the respective switch 130 (e.g., first switch 130*a* or second switch 130*b*) in transfer switch 102 connecting the transformer 112 to the first source 104 or second source 108, a first set of gate pulse signals is sent during the positive cycle to the SSSD 132*a* of the first switching pair 134. In the first switching pair 134, the first set of gate pulse signals is sent to the SSSD 132*a* to enable the phase current to flow in the forward direction and saturate the transformer flux. In some embodiments, the SSSD 132*a* may be cycled on during the positive polarity of the input phase voltage until the phase current is greater than 1.2% of rated current. Once saturation is reached, a second set of gate signals is sent during the negative polarity of the input phase voltage to cycle on the SSSD 132*b* at the first switching pair 134. At the next cycle, both the SSSD 132*a* and the SSSD 132*b* may be cycled on/off in normal operation of the switch 130.

Referring to FIG. 7, there is illustrated graphs 402, 404, 406, 408, 410, 412 depicting the energization of the transformer 112 with the transfer switch such as transfer switch 102 of system 100. Graph 402 illustrates waveforms of an input phase voltage at transfer switch 102 as a function of time and corresponding to one of the phases of a three-phase power source such as, for example, first source 104 or second source 108. Graphs 404 illustrates the first set of gate signals provided to SSSD 132*a* of the first switching pair 134. Graph 406 illustrates the second set of gate pulse signals provided to SSSD 132*b* of the first switching pair 134. Graph 408 shows a waveform of an output phase voltage from transfer switch 102. Graph 410 shows an output phase current from transfer switch 102. Graph 412 shows a transformer phase flux. When the SSSDs 132 in the switches 130 include SiC MOSFETs, as in FIG. 7, the first set of gate pulse signals turns on SSSD 132*a* to enable current to flow in the forward direction, thereby causing the transformer flux to increase until it reaches saturation, according to some embodiments. Once saturation is reached, the first set of gate pulse signals is turned off and the second set of gate pulse signals is turned on to keep the transformer flux from remaining at the saturation point. Additionally, at the next cycle, the SSSD 132*a* and SSSD 132*b* are operated in a normal operating mode based on the polarity of the input phase voltage.

Referring to FIG. 8, there is illustrated graphs 502, 504, 506, 508, 510, 512 depicting the energization of the transformer 112 with the transfer switch such as transfer switch 102 of system 100. Graph 502 illustrates waveforms of an input phase voltage at transfer switch 102 as a function of time and corresponding to one of the phases of a three-phase power source such as, for example, first source 104 or second source 108. Graphs 504 illustrates the first set of gate signals provided to the SSSD 132*a* of the first switching pair 134. Graph 506 illustrates the second set of gate pulse signals provided to the SSSD 132*b* of the first switching pair 134. Graph 508 shows a waveform of an output phase voltage from transfer switch 102. Graph 510 shows an output phase current from transfer switch 102. Graph 512 shows a transformer phase flux. When the SSSDs 132 of the first switching pair 134 include SCRs with paralleled RTO circuits 144, as shown in FIG. 8, the controller 122 sends the first set of gate signals to cycle SSSD 132*a* of the first switching pair 134 on/off for one or more first periods of time during the positive polarity of the input phase voltage, which results in a gradual ramp up of the transformer flux until the transformer flux reaches saturation. Once saturation is reached, the first set of gate signals is turned off to cycle off the SSSD 132*a* and a second set of gate signals is sent to cycle on the SSSD 132*b* of the first switching pair 134 to keep the transformer flux from remaining at the saturation point. Additionally, at the next cycle, the SSSD 132*a* and SSSD 132*b* are operated in a normal operating mode based on the polarity of the input phase voltage.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "between" does not necessarily require being disposed directly next to other elements. Generally, this term means a configuration where something is sandwiched by two or more other things. At the same time, the term "between" can describe something that is directly next to two opposing things. Accordingly, in any one or more of the embodiments disclosed herein, a particular structural component being disposed between two other structural elements can be:

- disposed directly between both of the two other structural elements such that the particular structural component is in direct contact with both of the two other structural elements;
- disposed directly next to only one of the two other structural elements such that the particular structural component is in direct contact with only one of the two other structural elements;
- disposed indirectly next to only one of the two other structural elements such that the particular structural component is not in direct contact with only one of the two other structural elements, and there is another element which juxtaposes the particular structural component and the one of the two other structural elements;
- disposed indirectly between both of the two other structural elements such that the particular structural component is not in direct contact with both of the two other structural elements, and other features can be disposed therebetween; or
- any combination(s) thereof.

As used herein "embedded" means that a first material is distributed throughout a second material.

ASPECTS

Various Aspects are described below. It is to be understood that any one or more of the features recited in the following Aspect(s) can be combined with any one or more other Aspect(s).

Aspect 1. A method for reducing inrush current to energize a transformer using a transfer switch, the transfer switch including a first switch connecting a first power source to the transformer and a second switch connecting a second power source to the transformer, the method comprising: monitoring, by a controller, an input phase voltage at a first switching pair at a first leg and a second switching pair at a second leg; sending, by the controller for each phase, a first set of gate signals to the first switching pair and a second set of gate signals to the second switching pair to selectively control cycling to couple the transformer to the first power source or the second power source; and operating, by the controller, the first switching pair and the second switching pair in a normal operating mode at a next cycle once a transformer flux reaches a saturation point and based on a polarity of the input phase voltage; wherein the first switch and the second switch each comprises the first switching pair connected to the second switching pair in a reverse orientation to enable a bi-directional flow of phase current at each phase.

Aspect 2. The method according to aspect 1, wherein sending the first set of gate signals to the first switching pair and the second set of gate signals to the second switching pair to selectively control the cycling further comprises: applying, by the controller for each phase, the first set of gate signals to the first switching pair based on the polarity of the input phase voltage to enable the transformer flux to build in a first direction, removing, by the controller, the first set of gate signals to turn off the first switching pair in response to the transformer flux reaching the saturation point, and applying, by the controller, the second set of gate signals to turn on the second switching pair in response to the transformer flux reaching the saturation point.

Aspect 3. The method according to any of the preceding aspects, wherein the saturation point comprises a sudden increase in source current.

Aspect 4. The method according to any of the preceding aspects, further comprising: sending, by the controller, the second set of gate signals to turn on the second switching pair at a same instant as the first set of gate signals is removed from the first switching pair to prevent the transformer flux from remaining in a saturation region.

Aspect 5. The method according to any of the preceding aspects, wherein the first switching pair and the second switching pair each comprises: a first switching device, and a second switching device.

Aspect 6. The method according to aspect 5, wherein the first switching device and the second switching device each comprises at least one of: silicon carbide metal-oxide-semiconductor field-effect transistors (SiC MOSFETs), insulated-gate bipolar transistors (IGBTs), and integrated gate-commutated thyristors (IGCTs).

Aspect 7. The method according to aspect 5, wherein the first switching device and the second switching device comprises: silicon controlled rectifiers (SCRs).

Aspect 8. The method according to aspect 7, wherein the first switching pair and the second switching pair each further comprises: a resonant circuit, wherein the resonant circuit is connected in parallel to the first switching pair or the second switching pair, the resonant circuit being configured to inject a reverse current to enable the first switching device and the second switching device to commute to zero.

Aspect 9. The method according to any of the preceding aspects, wherein operating the first switching pair and the second switching pair in the normal operating mode further comprises: selectively controlling, by the controller, an operation of the first switching pair and the second switching pair for each cycle based on the polarity of the input phase voltage to enable the transformer flux to gradually ramp up to saturation.

Aspect 10. A system comprising: a first power source; a second power source; a transformer; a transfer switch comprising: a first switch connecting the first power source to the transformer, and a second switch connecting the second power source to the transformer; and a controller comprising: a processor, and a non-transitory computer readable medium having stored thereon one or more instructions executable by the processor to perform operations comprising: monitor an input phase voltage at a first switching pair at a first leg and a second switching pair at a second leg, send a first set of gate signals to the first switching pair and a second set of gate signals to the second switching pair to selectively control cycling to couple the transformer to the first power source or the second power source, and operate the first switching pair and the second switching pair in a normal operating mode at a next cycle once a transformer flux reaches a saturation point and based on a polarity of the input phase voltage, wherein the first switch and the second switch each comprises the first switching pair connected to the second switching pair in a reverse orientation to enable a bi-directional flow of phase current at each phase.

Aspect 11. The system according to aspect 10, wherein sending the first set of gate signals to the first switching pair and the second set of gate signals to the second switching pair to selectively control the cycling at the first switch or the second switch further comprises: apply the first set of gate signals to the first switching pair based on the polarity of the input phase voltage to enable the transformer flux to build in a first direction, remove the first set of gate signals to turn off the first switching pair in response to the transformer flux reaching a saturation point, and apply the second set of gate signals to turn on the second switching pair in response to the transformer flux reaching the saturation point; wherein the saturation point comprises a sudden increase in source current.

Aspect 12. The system according to aspects 10 or 11, the operations further comprising: sending, by the controller, the second set of gate signals to turn on the second switching pair at a same instant as the first set of gate signals is removed from the first switching pair to prevent the transformer flux from remaining in a saturation region.

Aspect 13. The system according to aspects 10, 11, or 12, wherein the first switching pair and the second switching pair each comprises: a first switching device, and a second switching device.

Aspect 14. The system according to aspect 13, wherein the first switching device and the second switching device each comprises at least one of: SiC MOSFETs, IGBTs, IGCTs, and SCRs.

Aspect 15. The system according to aspects 13 or 14, wherein the first switching device and the second switching device comprises SCRs, and the first switching pair and the second switching pair each further comprises: a resonant circuit, wherein the resonant circuit is connected in parallel to the first switching pair or the second switching pair, the resonant circuit being configured to inject a reverse current to enable the first switching device and the second switching device to commute to zero.

Aspect 16. A transfer switch device comprising: a first switch connected to a first power source; a second switch connected to a second power source; and wherein the first switch and the second switch each comprises: a first switching pair at a first leg, and a second switching pair at a second leg, wherein the first switching pair is connected to the second switching pair in a reverse orientation to enable a bi-directional flow of phase current, wherein a controller in electrical connection with the transfer switch device performs operations comprising: monitor, at each phase, an input phase voltage at the first switching pair and the second switching pair, send a first set of gate signals to the first switching pair and second set of gate signals to the second switching pair to selectively control cycling to couple a transformer to the first power source or the second power source, and operate the first switching pair and the second switching pair in a normal operating mode at a next cycle once a transformer flux reaches its saturation point and based on a polarity of the input phase voltage.

Aspect 17. The transfer switch device according to aspect 16, wherein sending the first set of gate signals to the first switching pair and the second set of gate signals to the second switching pair to selectively control the cycling at the first switch or the second switch further comprises: apply the first set of gate signals to the first switching pair based on the polarity of the input phase voltage to enable the transformer flux to build in a first direction, remove the first set of gate signals to turn off the first switching pair in response to the transformer flux reaching a saturation point, apply the second set of gate signals to turn on the second switching pair in response to the transformer flux reaching the saturation point, and sending, by the controller, the second set of gate signals to turn on the second switching pair at a same instant as the first set of gate signals is removed from the first switching pair to prevent the transformer flux from remaining in a saturation region, wherein the saturation point comprises a sudden increase in source phase current, and the controller sends the second set of gate signals to turn on the second switching pair at a same instant as the first set of gate signals is removed from the first switching pair to prevent the transformer flux from remaining in a saturation region.

Aspect 18. The transfer switch device according to aspects 16 or 17, wherein the first switching pair and the second switching pair each comprises: a first switching device, and a second switching device, wherein the first switching device and the second switching device comprises at least one of: SiC MOSFETs, IGBTs, IGCTs, and SCRs.

Aspect 19. The transfer switch device according to aspects 16, 17, or 18, wherein the first switching device and the second switching device each comprise SCRs, wherein, at each phase, the first switch and the second switch each further comprises: a resonant circuit, wherein the resonant circuit is connected in parallel to the first switching pair or the second switching pair, the resonant circuit being configured to inject a reverse current to enable the first switching device and the second switching device to commute to zero.

Aspect 20. The transfer switch device according to aspects 16, 17, 18, or 19, wherein the operations further comprise: cycling the first switching pair on/off for one or more cycles over a time period to enable the transformer flux to gradually ramp up in a first direction.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A method for reducing inrush current to energize a transformer from a first power source or a second power source using a transfer switch, the transfer switch including a first switch and a second switch connecting the transformer to the first power source or the second power source, respectively, the method comprising:
- monitoring, by a controller, an input phase voltage at one of the first switch or the second switch energizing the transformer from the first power source or the second power source, respectively;
- sending, by the controller and at each phase, a set of gate signals to selectively control cycling of a switching pair of the first switch or the second switch to couple the transformer to the first power source or the second power source, respectively, based on a polarity of the input phase voltage; and
- operating, by the controller, the switching pair in a normal operating mode at a next cycle of the input phase voltage once a transformer flux reaches a saturation point,
  - wherein the switching pair comprises:
  - a first solid-state switching device (SSSD), and
  - a second SSSD connected in reverse orientation relative to the first SSSD to enable a bi-directional flow of phase current at each phase,
- wherein sending the set of gate signals to selectively control cycling of the switching pair further comprises:
  - applying, by the controller for each phase, a first set of gate signals to turn on the first SSSD based on the polarity of the input phase voltage to enable the transformer flux to build in a first direction,
  - removing, by the controller, the first set of gate signals to turn off the first SSSD in response to the transformer flux reaching the saturation point,
  - applying, by the controller, a second set of gate signals to turn on the second SSSD in response to the transformer flux reaching the saturation point, and
  - sending, by the controller, the second set of gate signals to turn on the second SSSD at a same instant as the first set of gate signals is removed from the first SSSD to prevent the transformer flux from remaining at the saturation point.

2. The method according to claim 1, wherein the first SSSD and the second SSSD comprise at least one of:
- silicon carbide metal-oxide-semiconductor field-effect transistors (SiC MOSFETs), insulated-gate bipolar transistors (IGBTs), integrated gate-commutated thyristors (IGCTs), and silicon controlled rectifiers (SCRs).

3. The method according to claim 2, wherein the first SSSD and the second SSSD comprise a first SiC MOSFET and a second SiC MOSFET connected in an anti-series arrangement.

4. The method according to claim 2, wherein the first SSSD and the second SSSD comprise a first SCR and a second SCR connected in an anti-parallel arrangement,
- wherein the method further comprises:
  - cycling, by the controller, the first SSSD on/off for one or more cycles to enable the transformer flux to gradually ramp up in a first direction.

5. The method according to claim 4, wherein the switching pair further comprises:
- a resonant circuit,
  - wherein the resonant circuit is connected in parallel to the first SSSD and the second SSSD, the resonant circuit being configured to inject a reverse current to enable the first SSSD and the second SSSD to commute to zero during a turn-off.

6. The method according to claim 4, wherein operating the switching pair in the normal operating mode further comprises:
- selectively controlling, by the controller, cycling operations of the first SSSD and the second SSSD for each cycle based on the polarity of the input phase voltage to enable the transformer flux to gradually ramp up to saturation.

7. The method according to claim 1, wherein the saturation point comprises a sudden increase in source current.

8. A system comprising:
- a first power source;
- a second power source;
- a transformer;
- a transfer switch comprising:

a first switch, wherein the first switch connects the first power source to the transformer, and a second switch, wherein the second switch connects the second power source to the transformer; and a controller comprising a processor, and a non-transitory computer readable medium having stored thereon one or more instructions executable by the processor to perform operations comprising:

monitor an input phase voltage at one of the first switch or the second switch energizing the transformer from the first power source or the second power source, respectively, send, at each phase, a set of gate signals to selectively control cycling of a switching pair of the first switch or the second switch to couple the transformer to the first power source or the second power source, respectively, based on a polarity of the input phase voltage, and operate the switching pair in a normal operating mode at a next cycle of the input phase voltage once a transformer flux reaches a saturation point, the switching pair comprising a first SSSD, and a second SSSD, wherein the first SSSD and the second SSSD of the switching pair are connected in a reverse orientation to enable a bi-directional flow of phase current at each phase, wherein sending the set of gate signals to selectively control cycling of the switching pair further comprises:

apply, for each phase, a first set of gate signals to the first SSSD based on the polarity of the input phase voltage to enable the transformer flux to build in a first direction, remove the first set of gate signals to turn off the first SSSD in response to the transformer flux reaching the saturation point, apply a second set of gate signals to turn on the second SSSD in response to the transformer flux reaching the saturation point, and send the second set of gate signals to turn on the second SSSD at a same instant as the first set of gate signals are removed from the first SSSD to prevent the transformer flux from remaining at the saturation point, wherein the saturation point comprises a sudden increase in source current.

9. The system according to claim 8, wherein the first SSSD and the second SSSD comprise at least one of:

silicon carbide metal-oxide-semiconductor field-effect transistors (SiC MOSFETs), insulated-gate bipolar transistors (IGBTs), integrated gate-commutated thyristors (IGCTs), and silicon controlled rectifiers (SCRs).

10. The system according to claim 9, wherein the first SSSD and the second SSSD comprise a first SiC MOSFET and a second SiC MOSFET connected in an anti-series arrangement.

11. The system according to claim 9, wherein the first SSSD and the second SSSD comprise a first SCR and a second SCR connected in an anti-parallel arrangement, wherein the switching pair further comprises:

a resonant circuit, wherein the resonant circuit is connected in parallel to the first SSSD and the second SSSD, the resonant circuit being configured to inject a reverse current to enable the first SSSD and the second SSSD to commute to zero during a turn-off.

12. A transfer switch device comprising:

a first switch connected to a first power source;

a second switch connected to a second power source; and a controller in electrical connection with the transfer switch device performs operations comprising:

monitor an input phase voltage at one of the first switch or the second switch energizing a transformer from the first power source or the second power source, respectively, send, at each phase, a set of gate signals to selectively control cycling of a switching pair to couple the transformer to the first power source or the second power source, respectively, based on a polarity of the input phase voltage, and operate the switching pair of the first switch or the second switch in a normal operating mode at a next cycle of the input phase voltage once a transformer flux reaches a saturation point, the switching pair comprising a first SSSD, and a second SSSD, wherein the first SSSD and the second SSSD of the switching pair are connected in a reverse orientation to enable a bi-directional flow of phase current at each phase;

wherein the first SSSD and the second SSSD comprise at least one of:

silicon carbide metal-oxide-semiconductor field-effect transistors (SiC MOSFETs), insulated-gate bipolar transistors (IGBTs), integrated gate-commutated thyristors (IGCTs), and silicon controlled rectifiers (SCRs), and wherein sending the set of gate signals to selectively control cycling of the switching pair comprises:

apply, for each phase, a first set of gate signals to the first SSSD based on the polarity of the input phase voltage to enable the transformer flux to build in a first direction, remove the first set of gate signals to turn off the first SSSD in response to the transformer flux reaching the saturation point, apply a second set of gate signals to turn on the second SSSD in response to the transformer flux reaching the saturation point, and send the second set of gate signals to turn on the second SSSD at a same instant as the first set of gate signals are removed from the first SSSD to prevent the transformer flux from remaining at the saturation point.

13. The transfer switch device according to claim 12, wherein the saturation point comprises a sudden increase in source phase current.

14. The transfer switch device according to claim 13, wherein the first SSSD and the second SSSD comprise a first SiC MOSFET and a second SiC MOSFET connected in an anti-series arrangement.

15. The transfer switch device according to claim 13, wherein the first SSSD and the second SSSD comprise a first SCR and a second SCR connected in an anti-parallel arrangement, wherein the switching pair further comprises:

a resonant circuit, wherein the resonant circuit is connected in parallel to the first SSSD and the second SSSD, the resonant circuit being configured to inject a reverse current to enable the first SSSD and the second SSSD to commute to zero during a turn-off.

16. The transfer switch device according to claim 15, wherein the operations further comprise:

cycling the first switching pair on/off for one or more cycles over a time period to enable the transformer flux to gradually ramp up in the first direction.

* * * * *